US012630310B1

(12) United States Patent
Wu et al.

(10) Patent No.: US 12,630,310 B1
(45) Date of Patent: May 19, 2026

(54) HEAT SPREADER WITH INTEGRATED SHOCK ISOLATION

(71) Applicant: BAE Systems Space & Mission Systems Inc., Broomfield, CO (US)

(72) Inventors: Gordon C. Wu, Melbourne, FL (US); Kevin E. Weed, Boulder, CO (US); Derek Chan, Boulder, CO (US); Andre Giron, Broomfield, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 453 days.

(21) Appl. No.: 17/990,283

(22) Filed: Nov. 18, 2022

Related U.S. Application Data

(60) Provisional application No. 63/284,126, filed on Nov. 30, 2021.

(51) Int. Cl.
*B64G 1/50* (2006.01)

(52) U.S. Cl.
CPC .................................. *B64G 1/506* (2013.01)

(58) Field of Classification Search
CPC ....... B64G 1/506; H01L 23/427; F28D 15/02; F28D 2015/0216; F28D 15/0275; F28D 15/046; F28F 2265/30; F28F 2280/00
See application file for complete search history.

(56) References Cited

U.S. PATENT DOCUMENTS

| | | | |
|---|---|---|---|
| 4,162,701 A | 7/1979 | Ollendorf | |
| 5,069,274 A | 12/1991 | Haslett et al. | |
| 5,351,746 A | 10/1994 | Mackey et al. | |
| 5,682,943 A | 11/1997 | Yao | |
| 5,730,211 A | 3/1998 | Conway | |
| 5,735,489 A | 4/1998 | Drolen et al. | |
| 5,806,803 A | 9/1998 | Watts | |
| 5,862,462 A | 1/1999 | Tyner et al. | |
| 6,151,216 A | 11/2000 | Vos | |
| 6,591,899 B1 | 7/2003 | Yee | |
| 6,776,220 B1 | 8/2004 | Low et al. | |
| 7,118,076 B2 | 10/2006 | Tjiptahardja et al. | |
| 7,513,462 B1 | 4/2009 | McKinnon et al. | |
| 8,240,612 B2 | 8/2012 | Jondeau et al. | |
| 8,820,684 B2 | 9/2014 | McKinnon et al. | |

(Continued)

OTHER PUBLICATIONS

U.S. Appl. No. 17/676,956, filed Feb. 22, 2022, Wu et al.

*Primary Examiner* — Len Tran
*Assistant Examiner* — Kamran Tavakoldavani
(74) *Attorney, Agent, or Firm* — Sheridan Ross P.C.

(57) ABSTRACT

Suspension systems are methods for isolating a component from vibration while removing heat from that component are provided. The system includes a suspension system and a thermal energy transfer assembly. The suspension system includes a first mounting panel, to which the component is fixed, a second mounting panel that is fixed to a platform, and a shock isolating assembly that interconnects the first and second mounting panels. The thermal energy transfer assembly includes a first heat pipe network disposed on or within the first mounting panel, a second heat pipe network disposed on or within the second mounting panel, and a heat pipe coupling assembly that thermally connects the first heat pipe network to the second heat pipe network. The component can be a heat generating component mounted to an exterior of a spacecraft.

22 Claims, 10 Drawing Sheets

(56) References Cited

U.S. PATENT DOCUMENTS

| | | | |
|---|---|---|---|
| 8,967,547 B2 | 3/2015 | Wong et al. | |
| 10,018,426 B2 | 7/2018 | Aston et al. | |
| 10,558,247 B2 | 2/2020 | Smith | |
| 2002/0139512 A1 | 10/2002 | Low et al. | |
| 2003/0051857 A1 | 3/2003 | Cluzet | |
| 2006/0108103 A1* | 5/2006 | Yu | F28D 15/0233 |
| | | | 165/104.26 |
| 2015/0234437 A1* | 8/2015 | Gallina | G06F 1/20 |
| | | | 361/679.32 |
| 2016/0305714 A1 | 10/2016 | Smith et al. | |
| 2020/0236812 A1* | 7/2020 | Smith | H05K 7/20445 |
| 2021/0112685 A1* | 4/2021 | Magi | F16F 15/08 |

* cited by examiner

HEAT SPREADER WITH INTEGRATED SHOCK ISOLATION

CROSS-REFERENCE TO RELATED APPLICATION

This application claims the benefit of U.S. Provisional Patent Application Ser. No. 63/284,126, filed Nov. 30, 2021, the entire disclosure of which is hereby incorporated herein by reference.

FIELD

Systems and methods for removing heat from and for providing shock isolation to selected components are provided.

BACKGROUND

In space vehicle design, shock loads from launch vehicle separation and unit launch lock activation need to be considered. Some units are sensitive to shock due to delicate electronics or other material inside the unit. It is oftentimes advantageous to place units in a certain location on the spacecraft due to either a desirable thermal environment, proximity to another unit, or numerous other reasons. But that location may be exposed to a high shock environment. Therefore, there is a need to mitigate the shock load to the unit by various means.

In various applications, including but not limited to space applications, it is desirable to remove heat from selected components, and in particular from heat generating components, while also providing shock isolation for such components. However, systems for removing heat from a component to a radiator or other heat dissipating assembly that also allow for motion between the component and the heat dissipating assembly are relatively inefficient, or expensive, and are complex to implement.

In a typical shock isolation arrangement on a spacecraft, the component requiring shock isolation is mounted to the spacecraft using a shock isolation or suspension assembly. Because the thermal conductivity of shock isolator assemblies is typically negligible, additional thermal energy or heat transfer components are required to transfer heat from the component suspended by the suspension assembly. As an example, a heat transfer component can include a flexible, thermally conductive element, such as a heat strap. Although a heat strap can provide good flexibility, the thermal conductivity of heat straps is relatively poor. The limitations in thermal conductivity can be at least partially addressed by providing a large number of heat straps. However, such an approach results in increased complexity, weight, and cost.

Accordingly, it would be desirable to provide a shock isolation system for a component carried by a spacecraft that efficiently removed heat from the component and that was relatively easy to assemble, highly efficient, and relatively low mass.

SUMMARY

Systems and methods for providing shock isolation and cooling for a component are provided. More particularly, suspension systems and methods that enable a heat generating component interconnected to a spacecraft or other platform to be isolated from shocks, while also providing thermal energy transfer features, are provided. The suspension system generally includes a first mounting plate or panel, a second mounting plate or panel, a shock isolating assembly mechanically coupling the first mounting panel to the second mounting panel, and a thermal energy transfer assembly thermally coupling the first mounting panel to the second mounting panel. The first mounting panel is mechanically fixed and thermally coupled to the component, and the second mounting panel is mechanically fixed and thermally coupled to the spacecraft or other structure. In general, the suspension system allows at least limited motion between the first and second mounting panels, and thus between the component and the spacecraft, while also damping that motion. The thermal energy transfer assembly thermally couples the first mounting panel to the second mounting panel, and is flexible enough to accommodate the limited motion between the mounting panels. Heat generated in the component can be transferred directly to the first mounting panel, which is in turn transferred to the second mounting panel by the thermal energy transfer assembly. The heat can then be removed from the second mounting panel by direct transfer to the structure to which it is mounted, or to a radiator or other thermal assembly.

The thermal energy transfer assembly is thermally interconnected to the first mounting panel at a first end, and is thermally interconnected to the second mounting panel at a second end. In accordance with embodiments of the present disclosure, one or both of the mounting panels can incorporate heat pipe networks. A heat pipe network provided as part of a mounting panel can be integral to or separate from other components of the thermal energy transfer assembly.

Additional features and advantages of embodiments of the disclosed systems and methods will become more readily apparent from the following description, particularly when taken together with the accompanying drawings.

DETAILED DESCRIPTION

Figure 1:
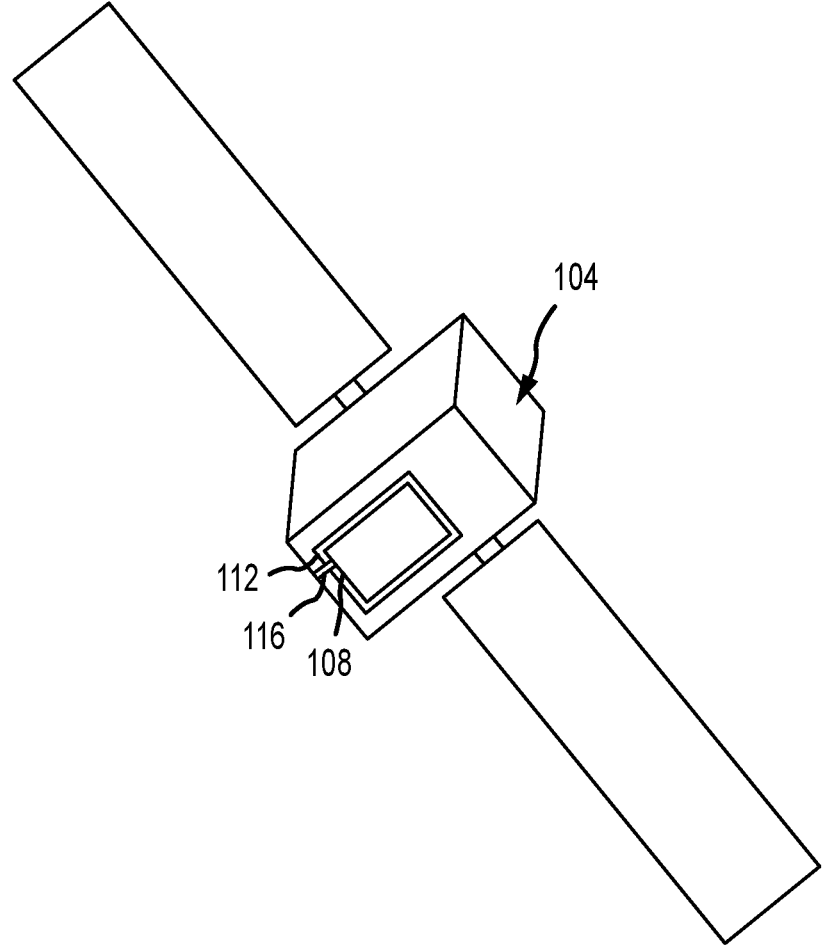
FIG. 1 depicts a spacecraft to which a component is mounted using a suspension system and a thermal energy transfer assembly in accordance with embodiments of the present disclosure.

FIG. 1 depicts a platform 104 having a component 108 interconnected thereto by a suspension system 112 and an associated a thermal energy transfer assembly 116 in accordance with embodiments of the present disclosure. In the illustrated example, the platform 104 is a satellite or other spacecraft. However, it should be appreciated that a platform 104 is not limited to a spacecraft, and can thus include any type of terrestrial, seaborne, or airborne craft, static structures, such as buildings or towers, or any other structure where the shock isolation features of the suspension system 112 and the thermal conductivity features of the thermal energy transfer assembly 116 as disclosed herein can be advantageously applied. Examples of the component 108 include powered electronics, such as a radio frequency amplifier, a power converter, processing assembly, or any other heat generating or heat sensitive component that also requires or can benefit from shock isolation relative to the platform 104. Although depicted in the figure as being mounted to an exterior surface of the platform 104, embodiments of the present disclosure can include a component 108 that is interconnected to an interior surface of element of a platform 104 by a suspension system 112 as discussed herein. In accordance with still other embodiments of the present disclosure, a suspension system 112 in accordance with embodiments of the present disclosure can be used to connect a component 108 to another component or system that may or may not be interconnected to a platform 104.

Figure 2A:
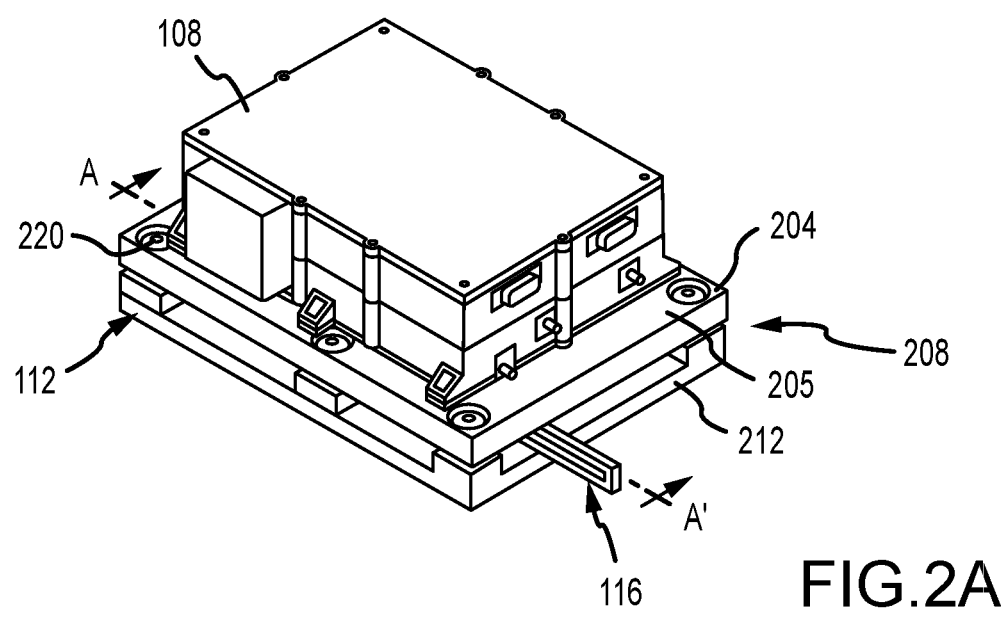
FIG. 2A depicts a suspension system and a thermal energy transfer assembly in accordance with embodiments of the present disclosure in a perspective view.
Figure 2B:
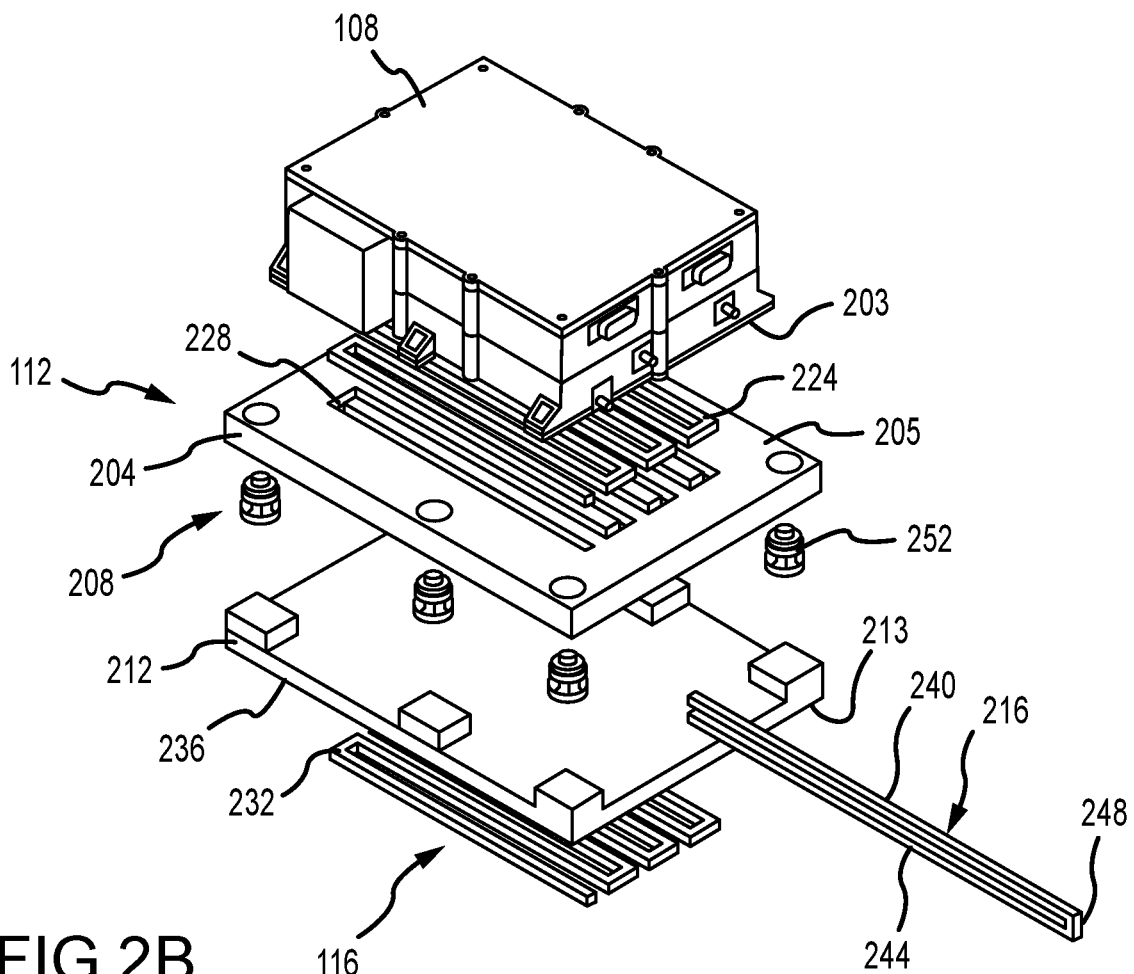
FIG. 2B depicts the suspension system and thermal energy transfer assembly of FIG. 2A in an exploded view.
Figure 2C:
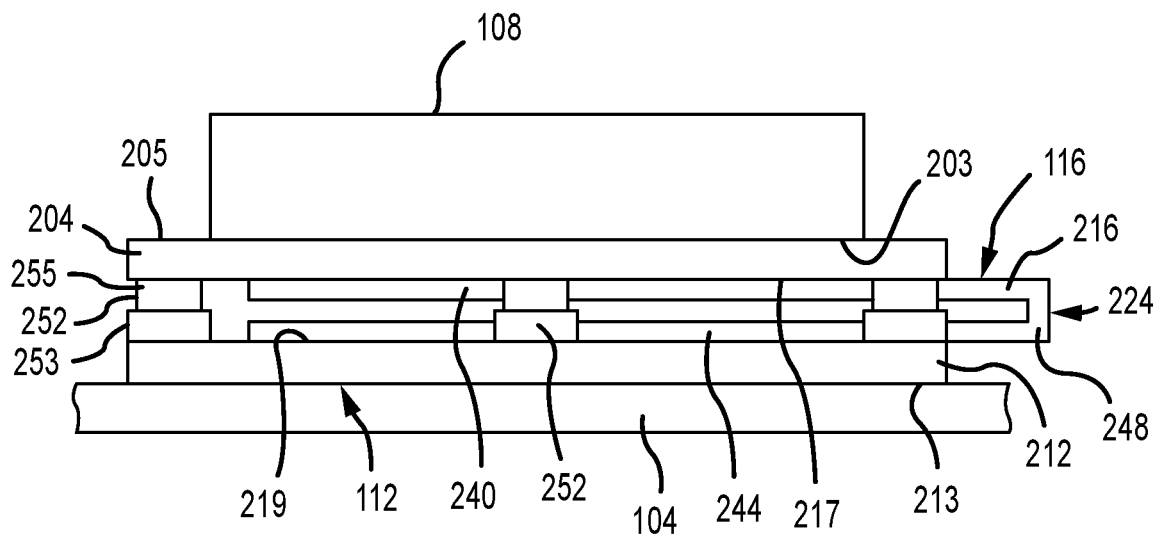
FIG. 2C depicts the suspension system and thermal energy transfer assembly of FIG. 2A in a side elevation view.
Figure 2D:
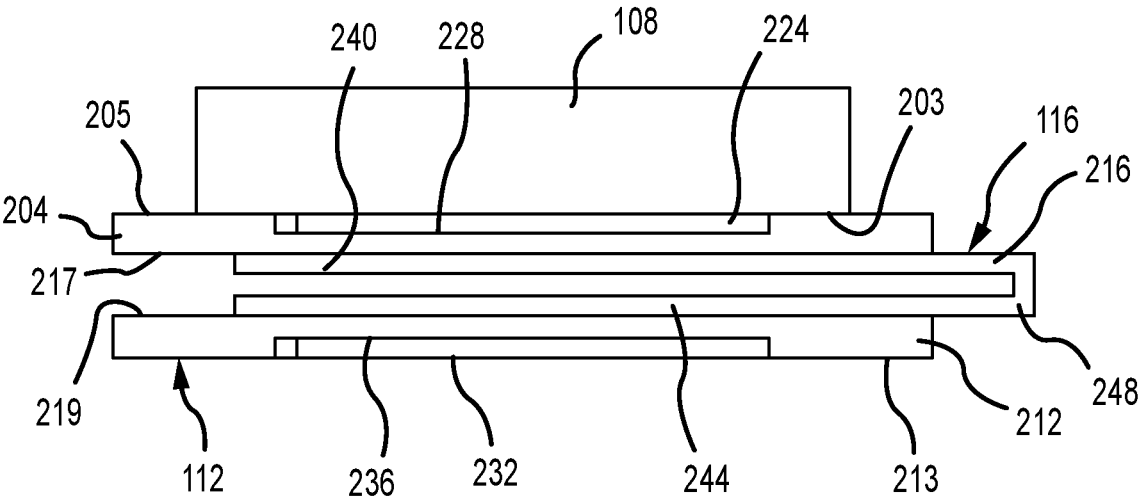
FIG. 2D depicts the suspension system and thermal energy transfer assembly of FIG. 2A in a cross-section in elevation view taken along section line A-A' of FIG. 2A.

FIG. 2A depicts a suspension system 112 and a thermal energy transfer assembly 116 in accordance with embodiments of the present disclosure, and an interconnected component 108, in a perspective view; FIG. 2B depicts the suspension system 112 and the thermal energy transfer assembly 116 of FIG. 2A in an exploded perspective view; FIG. 2C depicts the suspension system 112 and the thermal energy transfer assembly 116 of FIG. 2A in a side elevation view; and FIG. 2D depicts the suspension system 112 and the thermal energy transfer assembly 116 of FIG. 2A in a cross-section in elevation taken along section line A-A' in FIG. 2A. The suspension system 112 generally includes a first mounting panel 204, a shock isolating assembly 208, and a second mounting panel 212. The component 108 is fixed to the first mounting panel 204. For example, the component 108 can be secured to a top or first surface 205 of the first mounting panel 204 by mechanical fasteners 220 or an adhesive. In addition, the component 108 is thermally coupled to the first mounting panel 204. This thermal coupling can include close contact between a thermally conductive bottom or mounting surface 203 of the component 108 and the adjoining, thermally conductive first surface 205 of the first mounting panel 204. Alternatively or in addition, a thermally conductive grease, adhesive, or other material can be placed between the mounting surface of the component 108 and the adjacent first surface 205 of the first mounting panel 204. In accordance with embodiments of the present disclosure, the first mounting panel 204 includes one or more channels or receiving features 228 that receive portions of the thermal energy transfer assembly 116 to increase an area of a thermal interface between the first mounting panel 204 and portions of a thermal energy transfer assembly 116. For instance, in the example configuration illustrated in FIGS. 2A-2D, a portion of the first surface 205 of the first mounting panel 204 is in contact with a portion of the thermal energy transfer assembly 116, and a series of channels 228 receive other portions of the thermal energy transfer assembly 116.

In accordance with embodiments of the present disclosure, and as illustrated in various of the figures, the thermal energy transfer assembly 116 can include one or more heat pipe networks or assemblies. In the example of FIGS. 2A-2D, the thermal energy transfer assembly 116 includes a first heat pipe network 224 that is disposed within a first set of receiving channels 228 formed in and distributed across at least portions of the first surface 205 of the first mounting panel 204, and in particular in areas adjacent the mounting surface 203 of the component 108. As can be appreciated by one of skill in the art after consideration of the present disclosure, placing the first heat pipe network 224 within a first set of grooves or channels 228 provides a large contact area between the first heat pipe network 224 and the first mounting panel 204, enhancing the transfer of heat from the first mounting panel 204 to the first heat pipe network 224. In addition, locating the first heat pipe network 224 on the first surface 205 side of the first mounting panel 204 enhances the transfer of heat from the component 108, either through direct contact with portions of the first heat pipe network 224 or through a relatively short path for heat to travel from the component 108, through the first mounting panel 204, and to the first heat pipe network 224. The disposition of the first heat pipe network 224 in channels 228 also can provide a more secure connection between the first heat pipe network 224 and the first mounting panel 204.

The second mounting panel 212 is fixed to the platform 104 (as depicted in FIG. 2C) by, for example, mechanical fasteners or an adhesive. The second mounting panel 212 is thermally coupled to the platform 104 through close contact between a thermally conductive first or mounting surface 213 of the second mounting panel 212 and an adjacent thermally conductive adjacent surface of the platform 104, and/or a thermally conductive grease, adhesive, or other material disposed between the first surface 213 of the second mounting panel 212 and the adjacent surface of the platform 104. In the illustrated embodiment, the second mounting panel 212 receives thermal energy transfer assembly 116 components in the form of a second heat pipe network 232 disposed within a second set of receiving channels 236 formed in and distributed across at least portions of the first surface 213 of the second mounting panel 212, adjacent a surface of the platform 104. Placing the second heat pipe network 232 within grooves or channels 236 provides a large contact area between the second heat pipe network 232 and the second mounting panel 212, enhancing the transfer of heat from the second heat pipe network 232 to the second mounting panel 212. In addition, locating the second heat pipe network 232 on the first surface 213 side of the first mounting panel 204 enhances the transfer of heat from the thermal energy transfer assembly 116, and thus from the component 108, to the platform 104, either through direct contact between portions of the surface of the platform 104 with portions of the second heat pipe network 232 or through a relatively short path for heat to travel from the second heat pipe network 232, through the second mounting panel 212, and to the platform 104. The disposition of the second heat pipe network 232 in channels 236 can also provide a more secure connection between the second heat pipe network 232 and the second mounting panel 212.

In the embodiment shown in FIGS. 2A-2D, the thermal energy transfer assembly 116 includes a heat pipe coupling assembly 216 that is thermally joined to the first mounting panel 204 along a first section 240, and that is thermally joined to the second mounting panel 212 along a second section 244. More particularly, the first section 240 of the heat pipe coupling assembly 216 is in direct contact with a second surface 217 of the first mounting panel 204, and the second section 244 of the heat pipe coupling assembly 216 is in direct contact with a second surface 219 of the second mounting panel 212. The first 240 and second 244 sections of the heat pipe coupling assembly 216 are integral to one another, and are joined at a connecting section 248. Together, the first 240, second 244, and connecting 248 sections define a generally U-shaped heat pipe coupling assembly 216. In accordance with embodiments of the present disclosure, the heat pipe coupling assembly 216 is configured such that it does not transfer vibration or force between the first 204 and second 212 mounting panels. In particular, the heat pipe coupling assembly 216 can be flexible or can have design features to mitigate a transfer of shock load between the first 204 and second 212 mounting panels. For example, the heat pipe coupling assembly 216 can be formed from flexible tubing, can include relatively long sections or portions that are not fixed to a mounting panel 204 or 212 or other structure, or can incorporate or a bellows or other features to provide flexibility.

The shock isolating assembly 208 mechanically interconnects the first mounting panel 204 to the second mounting panel 212, while allowing at least limited motion between the first mounting panel 204 and the second mounting panel 212. The shock isolating assembly 208 can also dampen relative motion between the first mounting panel 204 and the second mounting panel 212. In the illustrated example, the shock isolating assembly 208 includes a plurality of vibration isolation mounts 252. As can be appreciated by one of skill in the art after consideration of the present disclosure, the vibration isolation mounts 252 allow for movement of the first mounting panel 204 relative to the second mounting panel 212, while also damping that relative movement. In accordance with the least some embodiments of the present disclosure, each vibration isolation mount 252 includes fixed 253 and elastomeric 255 elements.

Figures 3A, 3B:
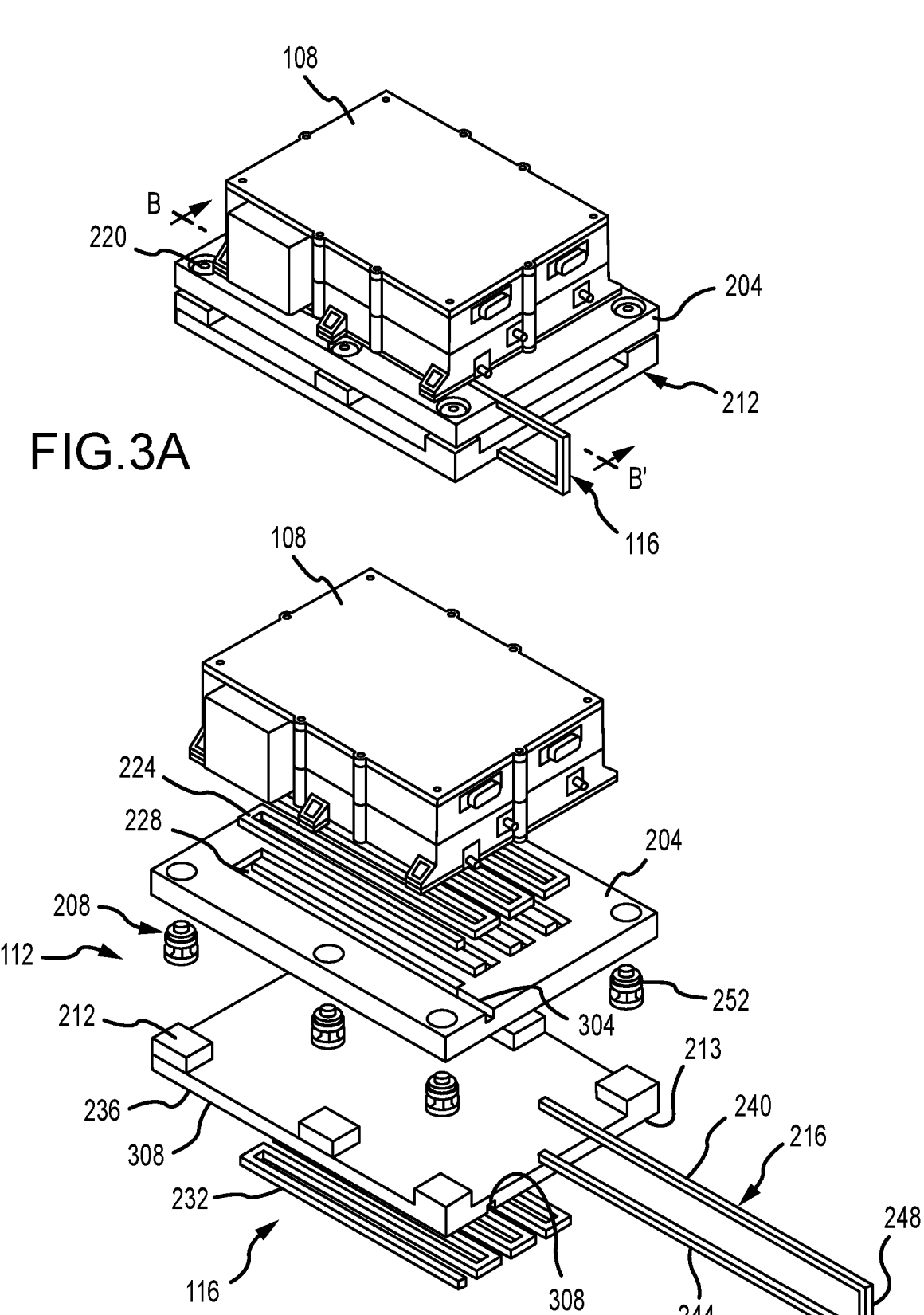
FIG. 3A depicts a suspension system and a thermal energy transfer assembly in accordance with other embodiments of the present disclosure in a perspective view.
FIG. 3B depicts the suspension system and thermal energy transfer assembly of FIG. 3A in an exploded perspective view.
Figure 3C:
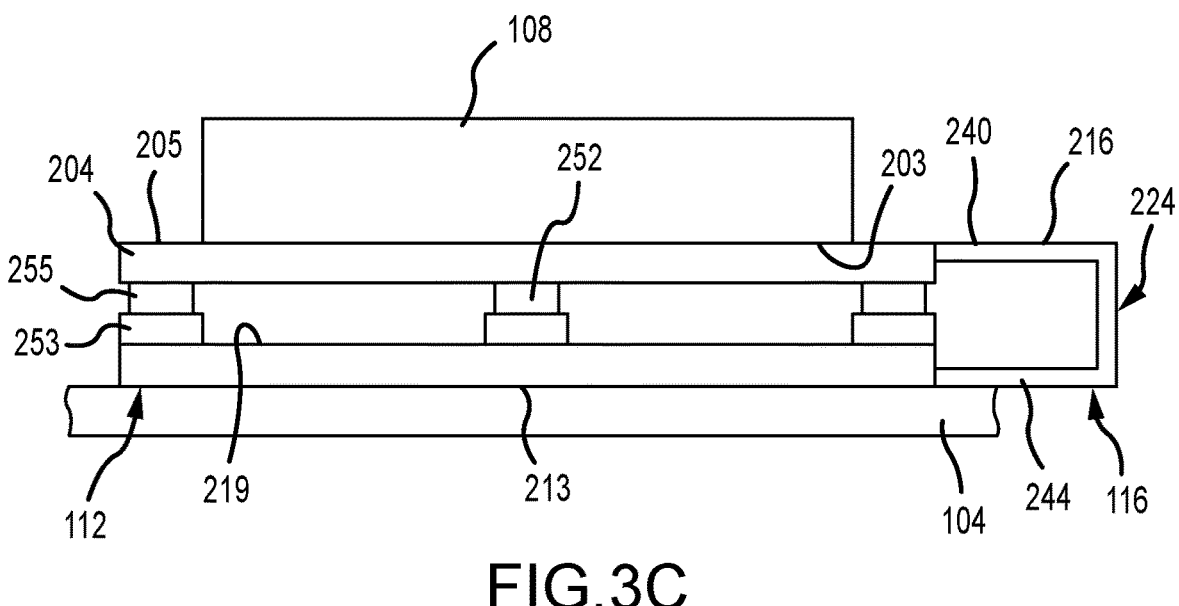
FIG. 3C depicts the suspension system and thermal energy transfer assembly of FIG. 3A in a side elevation view.
Figure 3D:
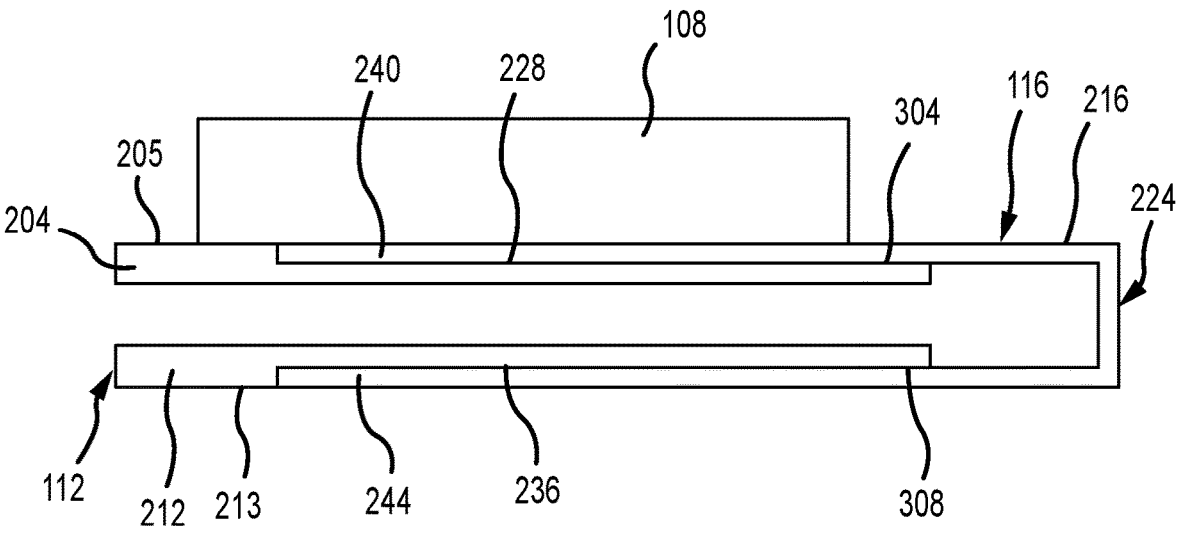
FIG. 3D depicts the suspension system and thermal energy transfer assembly of FIG. 3A in a cross-section in elevation view taken along section line B-B' of FIG. 3A.

FIG. 3A depicts a suspension system 112 and a thermal energy transfer assembly 116 in accordance with other embodiments of the present disclosure, and an interconnected component, in a perspective view; FIG. 3B depicts the suspension system 112 and the thermal energy transfer assembly 116 of FIG. 3A in an exploded perspective view; FIG. 2C depicts the suspension system 112 and the thermal energy transfer assembly 116 of FIG. 3A in a side elevation view; and FIG. 3D depicts the suspension system 112 and the thermal energy transfer assembly 116 of FIG. 3A in a cross-section in elevation taken along section line B-B' in FIG. 3A. The suspension system 112 generally includes a first mounting panel 204, a shock isolating assembly 208, and a second mounting panel 212. Various elements of this additional example embodiment of the present disclosure are the same as or similar to other embodiments discussed herein. This includes the structural and thermal connection of a component 108 to the first surface 205 of the first mounting panel 204, the structural connection of the first mounting panel 204 to the second mounting panel 212 through a shock isolating assembly 208 and the thermal connection of the first 204 and second 212 mounting panels through a thermal energy transfer assembly 116, and the structural and thermal connection of the second mounting panel 212 to a surface of a platform 104. Accordingly, the following discussion will be primarily directed to those aspects of the illustrated embodiment that differ from the embodiment illustrated in connection with FIGS. 2A-2D.

In the configuration illustrated in FIGS. 3A-3D, a heat or thermal energy transfer assembly 116 is provided as three separate elements: a heat pipe coupling assembly 216; a first heat pipe network 224; and a second heat pipe network 232. As in the previously described embodiment, a first set of grooves or channels 228 is formed in and distributed across at least portions of the first surface 205 of the first mounting panel 204 in which the first heat pipe network 224 is received, and a second set of grooves or channels 228 is formed in and distributed across at least portions of the first surface 213 of the second mounting panel 212. In addition, in this further embodiment, the first mounting panel 204 includes a first heat pipe coupling assembly 216 receiving element or channel 304. More particularly, in the illustrated configuration, the first receiving element 304 extends along a portion of the receiving channels 228 for the first heat pipe network 224, such that at least a portion of the first section 240 of the heat pipe coupling assembly 216 lies below the surface 205 of the first panel 204 and directly against a section of the first heat pipe network 224. Moreover, the first receiving element 304 extends to an edge of the first mounting panel 204, from which a portion of the first section 240 extends to join a connecting section 248 of the heat pipe coupling assembly 216. Similarly, the second mounting panel 212 is provided with a second heat pipe coupling assembly receiving element or channel 308. The second receiving element 308 extends along a portion of the receiving channels 236 for the second heat pipe network 232, in a manner similar to the relationship of the first receiving element 304 to the first receiving channels 228. As a result, at least a portion of the second section 244 of the heat pipe coupling assembly 216 lies below the surface 213 of the second panel 212 and directly against a section of the second heat pipe network 232. The second receiving element 308 also extends to an edge of the second mounting panel 212, from which a portion of the second section 244 extends to join the first section 240 at the connecting section 248 of the heat pipe coupling assembly 216. In other respects, the suspension system having a thermal energy transfer assembly 116 of FIGS. 3A and 3B can be the same as the suspension system having a thermal energy transfer assembly 116 of FIGS. 2A and 2B.

Figures 4A, 4B:
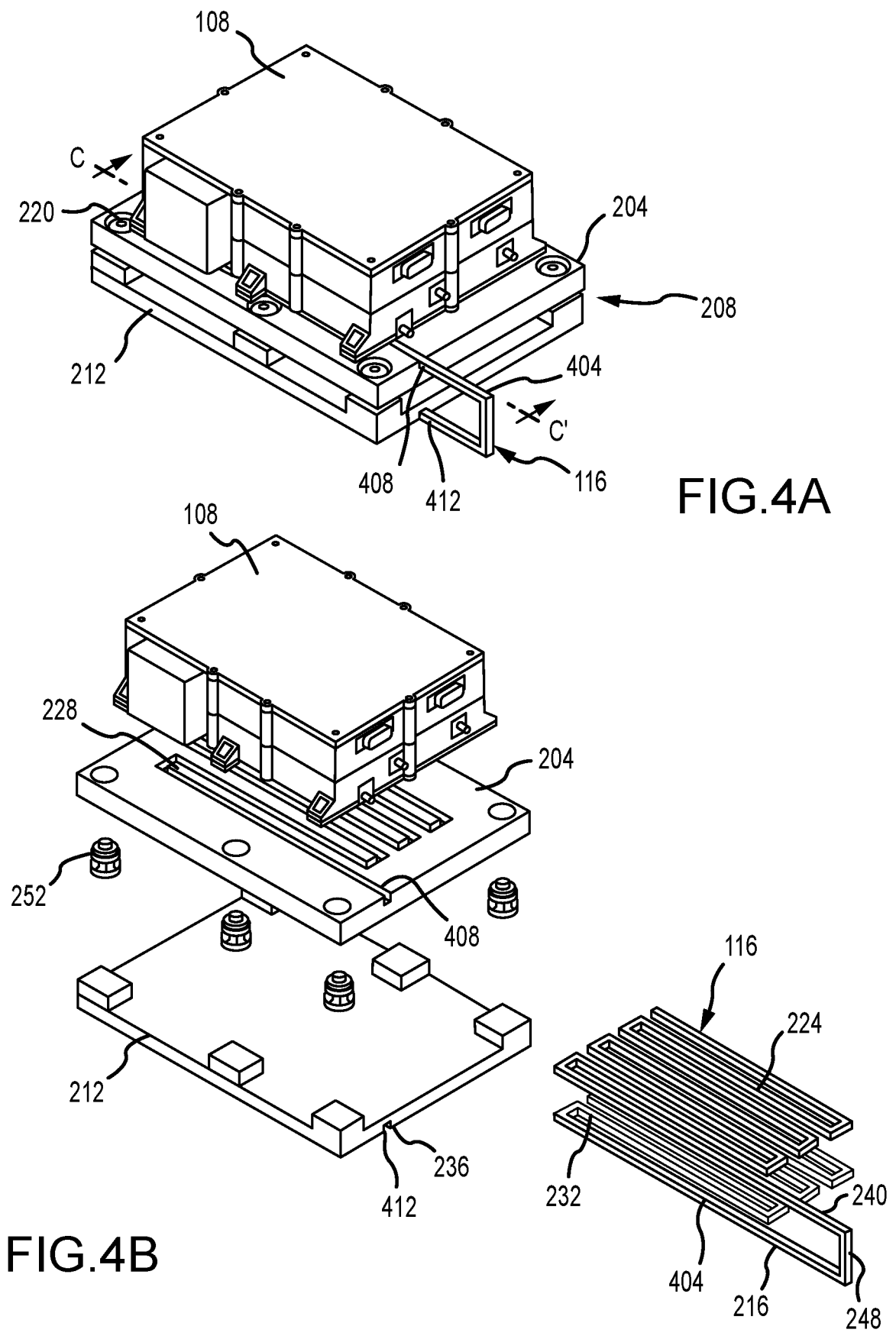
FIG. 4A depicts a suspension system and a thermal energy transfer assembly in accordance with other embodiments of the present disclosure in a perspective view.
FIG. 4B depicts the suspension system and thermal energy transfer assembly of FIG. 4A in an exploded perspective view.
Figure 4C:
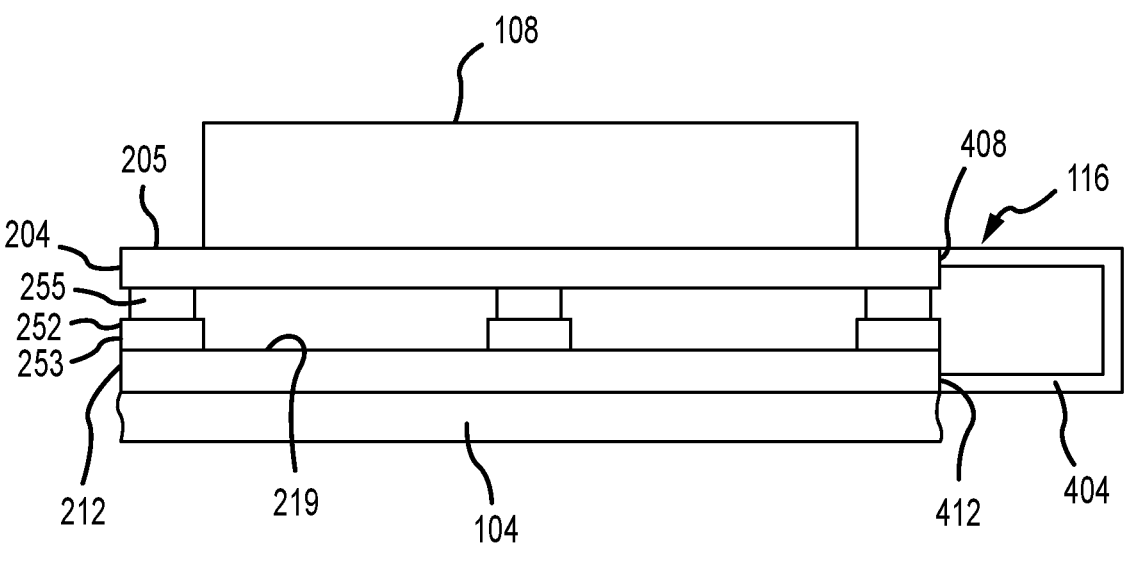
FIG. 4C depicts the suspension system and thermal energy transfer assembly of FIG. 4A in a side elevation view.
Figure 4D:
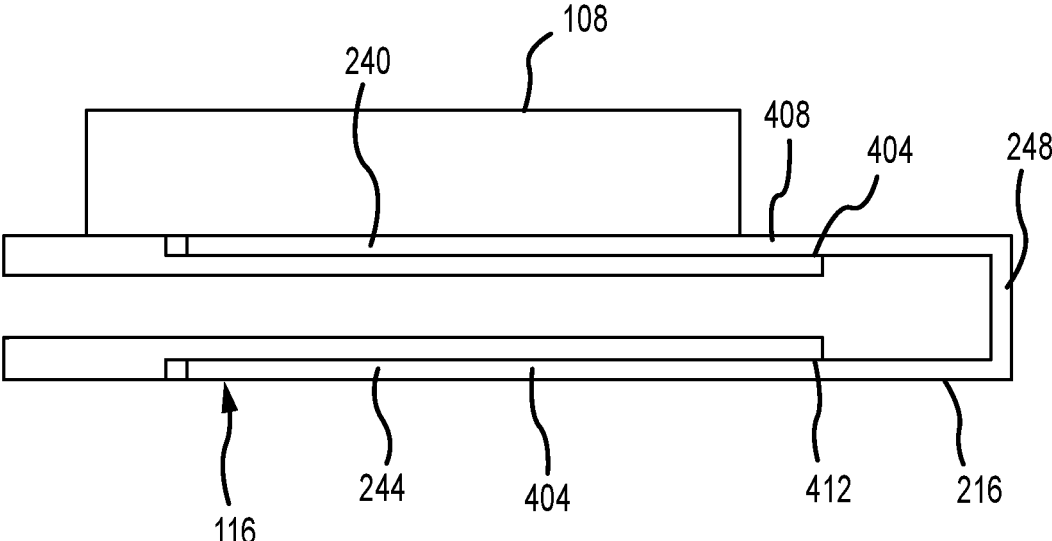
FIG. 4D depicts the suspension system and thermal energy transfer assembly of FIG. 4A in a cross-section in elevation view taken along section line C-C' of FIG. 4A.

FIG. 4A depicts a suspension system 112 and a thermal energy transfer assembly 116 in accordance with still other embodiments of the present disclosure, and an interconnected component 108, in a perspective view; FIG. 4B depicts the suspension system 112 and the thermal energy transfer assembly 116 of FIG. 4A in an exploded perspective view; FIG. 4C depicts the suspension system 112 and the thermal energy transfer assembly 116 of FIG. 4A in a side elevation view; and FIG. 4D depicts the suspension system 112 and the thermal energy transfer assembly 116 of FIG. 4A in a cross-section in elevation taken along section line C-C' in FIG. 4A. The suspension system 112 generally includes a first mounting panel 204, a shock isolating assembly 208, and a second mounting panel 212. In the configuration illustrated in FIGS. 4A-4D, the heat pipe coupling assembly 216, the first heat pipe network 224, and the second heat pipe network 232 of the thermal energy transfer assembly 116 are provided as a single integrated heat pipe system 404. In the illustrated configuration, one section or leg 408 of the first heat pipe network receiving channels 228 extends to a periphery of the first mounting panel 204, allowing the first section 240 of the heat pipe coupling assembly 216 and the first heat pipe network 224 portions of the integrated heat pipe system 404 to fall within a first plane. The second heat pipe network receiving channels 236 can be configured such they mirror the first heat pipe network receiving channels 228. Accordingly, the second heat pipe network receiving channels 236 can include one section or leg 412 that extends to a periphery of the second mounting panel 212, allowing the second section 244 of the heat pipe coupling assembly 216 and the second heat pipe network 232 sections of the integrated heat pipe system 404 to fall within a second plane.

In accordance with embodiments of the present disclosure, various heat pipe network 224 and 232 configurations are possible. For instance, multiple heat pipe networks 224 can be disposed within a single mounting panel 204 or 212. Where a mounting panel 204 or 212 includes multiple heat pipe networks, those networks can be disposed in different or the same planes. Alternatively or in addition, multiple heat pipe coupling assemblies 216 can be provided. The different heat pipe networks 224 and coupling assemblies 216 can be integral to one or more other networks or assemblies, or can be provided as separate heat pipe volumes. Moreover, in addition to symmetrically disposed serpentine configurations, other configurations for heat spreading, including configurations that vary the density of heat pipes within selected areas of a mounting panel 204 or 212, are possible. For example, a first section of a heat pipe network 224 or 232 can be formed on a first surface of an associated mounting panel 204 or 212, and a second section of the heat pipe network 224 or 232 can be formed on a second surface of the associated mounting panel 204 or 212. In accordance with still other embodiments, a heat pipe network 224 or 232 can be internal to an associated mounting panel 204 or 212, or can be disposed on a surface of an associated mounting panel 204 or 212, as opposed to being disposed within a groove formed in a surface of an associated mounting panel 204 or 212.

A thermal energy transfer assembly 116 in accordance with embodiments of the present disclosure can thus have various arrangements. For example, as shown and described in connection with FIGS. 2A-2D, and 3A-3D, the heat pipe coupling assembly 216, the first heat pipe network 224, and the second heat pipe network 232 can each be configured as separate heat pipe elements. As another example, as shown and described in connection with FIGS. 4A-4D, the heat pipe coupling assembly 216, the first heat pipe network 224, and the second heat pipe network 232 can be implemented as a single, integral heat pipe element. In accordance with still other embodiments of the present disclosure, different divisions can be made. For instance, the heat pipe coupling assembly 216 can be integral to either the first heat pipe network 224 or the second heat pipe network 232. As a further example, where multiple heat pipe networks are disposed withing a mounting panel 204 or 212, the different heat pipe networks can be separate from or integral to one another.

As can be appreciated by one of skill in the art after consideration of the present disclosure, thermal connections between surfaces of the mounting panels 204 and 212, or interior surfaces of grooves formed as part of various receiving structures or elements 228, 236, 304, or 308 with a mounting panel 204 or 212, and heat pipe elements 224, 232, or 216 (or portions thereof) can be established by close contact between the surface of the panel or structure and a section of heat pipe. In addition, a thermally conductive material, including but not limited to a thermally conductive grease, can be disposed at the various interfaces. The exterior surfaces of the heat pipe elements 224, 232, or 216 and or adjacent surfaces of the mounting panels 204 and 212 and of grooves formed therein can also be shaped to enhance the area of contact between adjacent components. Examples of interfaces between sections of heat pipe 504, which can be included as part of various portions of a thermal energy transfer assembly 116 in accordance with embodiments of the present disclosure, and a mounting panel (in the examples, a first mounting panel 204, although, as can be appreciated by one of skill in the art, the examples can also apply to interfaces between sections of heat pipe 504 and a second panel 212), are depicted in FIGS. 5A-5F.

Figure 5A:
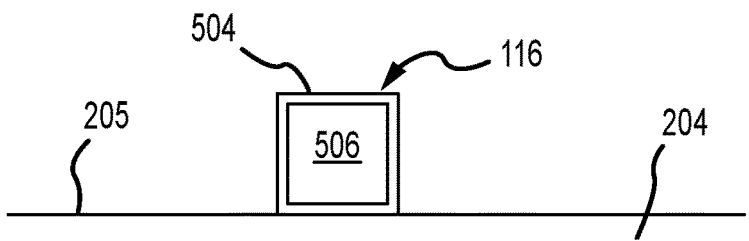
FIG. 5A depicts an interface between a section of heat pipe and a mounting panel in accordance with embodiments of the present disclosure.

In FIG. 5A, an example interface between a section of a heat pipe 504 included in a thermal energy transfer assembly 116 in accordance with embodiments of the present disclosure and a first surface 205 of a first mounting panel 204 is illustrated. More particularly, the heat pipe 504 in this example has a square cross-section, with one side in direct contact with the first surface 205 of the first mounting panel 204. In accordance with embodiments of the present disclosure, the section of heat pipe 504 in contact with the first surface 205 of the first mounting panel 204 can be held in position by an adhesive, soldering, welding, or mechanical fasteners. Moreover, as can be appreciated by one of skill in the art after, the heat pipe 504 components of a thermal energy transfer assembly 116 in accordance with embodiments of the present disclosure 504 contains a working fluid 506.

Figure 5B:
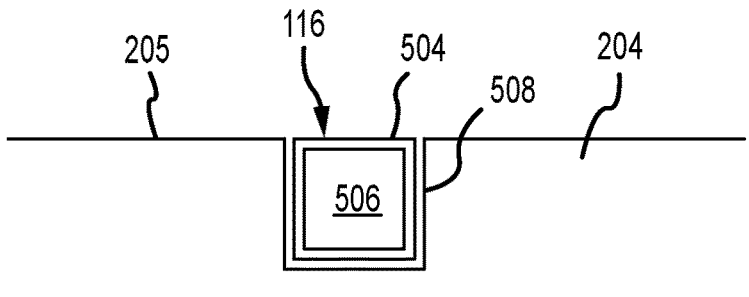
FIG. 5B depicts an interface between a section of heat pipe and a mounting panel in accordance with other embodiments of the present disclosure.

In FIG. 5B, an example interface between a section of a heat pipe 504 included in a thermal energy transfer assembly 116 in accordance with embodiments of the present disclosure and a first mounting panel 204 having a groove or receiving channel 508, for instance provided as part of a first set of receiving channels 228, is illustrated. In this example, both the heat pipe 504 and the groove 508 have a square cross-section. This configuration allows three sides of the section of heat pipe 504 disposed within the groove 508 to be in direct contact, or in thermal contact via a thermally conductive adhesive or other thermally conductive material 512, with the first mounting panel 204. Whether or not a thermally conductive adhesive 512 is used in connection with the section of heat pipe 504, the section of heat pipe 504 disposed within the groove 508 can be held in position by soldering, welding, or mechanical fasteners.

Figure 5C:
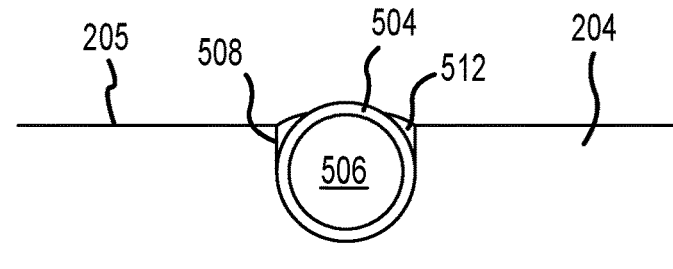
FIG. 5C depicts an interface between a section of heat pipe and a mounting panel in accordance with other embodiments of the present disclosure.

In FIG. 5C, an example interface between a section of a heat pipe 504 included in a thermal energy transfer assembly 116 in accordance with other embodiments of the present disclosure and a first mounting panel 204 having a groove or receiving channel 508, for instance provided as part of a first set of receiving channels 228, is illustrated. In this example, both the heat pipe 504 and the groove 508 have a round cross-section. This configuration allows the least half of an exterior surface area of the section of heat pipe 504 disposed within the groove 508 to be in direct contact with the first mounting panel 204. In addition, as in the illustrated example, where the groove 508 has a depth that is greater than one half of an outer diameter of the heat pipe 504 section, additional surface area of the section of heat pipe 504 can be placed in thermal contact with the first mounting panel 204 by providing a thermally conductive adhesive or other thermally conductive material 512.

Figure 5D:
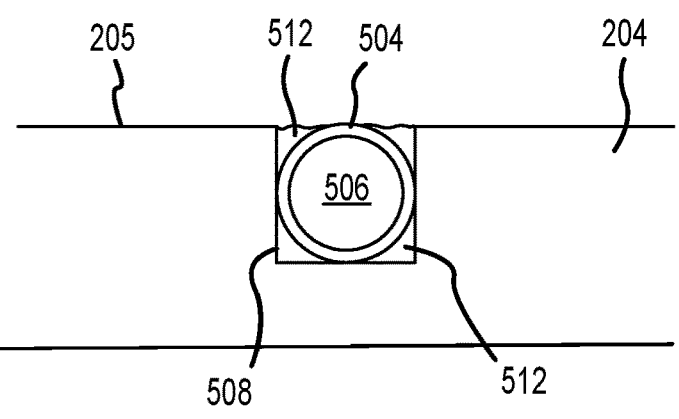
FIG. 5D depicts an interface between a section of heat pipe and a mounting panel in accordance with other embodiments of the present disclosure.

In FIG. 5D, another example interface between a section of a heat pipe 504 included in a thermal energy transfer assembly 116 in accordance with embodiments of the present disclosure and a first mounting panel 204 having a groove or receiving channel 508, for instance provided as part of a first set of receiving channels 228, is illustrated. In this example, the heat pipe 504 has a round cross-section and the groove 508 has a square cross-section. This configuration allows at least three lines of direct contact between an outer surface of the portion of the heat pipe 504 disposed within the groove 508, and the first mounting panel 204. In addition, where, as in the illustrated example, the groove 508 is deep enough to allow the heat pipe 504 to lie below the first surface 205 of the first mounting panel 204, a thermal adhesive or other thermally conductive material 512 can be provided across a top half or most of a top half of the section of heat pipe 504 disposed within the groove 508. In addition, a thermally conductive adhesive or other thermally conductive material 512 can be disposed between at least some of the bottom half of the section of heat pipe 504 disposed within the groove 508.

Figure 5E:
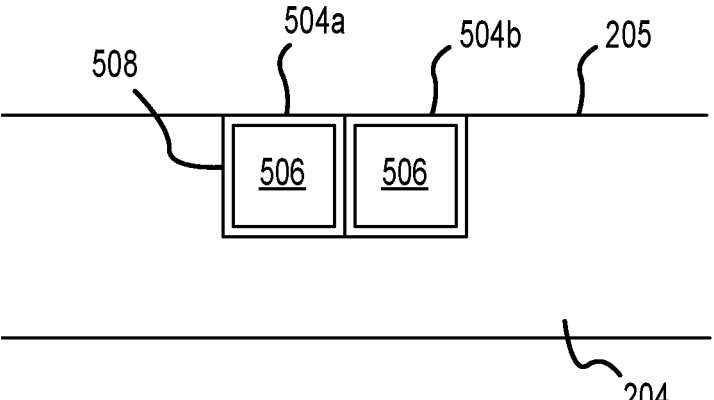
FIG. 5E depicts an interface between two sections of heat pipe and a mounting panel in accordance with embodiments of the present disclosure.

FIG. 5E is an example of an interface between first 504a and second 504b sections of heat pipe 504 included in a thermal energy transfer assembly 116 in accordance with other embodiments of the present disclosure and a first mounting panel 204 having a groove or receiving channel 508, for instance provided as part of a first set of receiving channels 228. For instance, the first section of heat pipe 504a may be provided as part of a heat pipe coupling assembly 216 portion of the thermal energy transfer assembly 116, and the second section of heat pipe 504b may be provided as part of a first heat pipe network 224 portion of the thermal energy transfer assembly 116. In this example, both sections 504a and 504b of heat pipe have a square cross-section, while the groove 508 has a rectangular cross-section. As the depth of the groove 508 is equal to a height of the sections 504a and 504b of heat pipe, and has a width equal to twice the width of the sections 504a and 504b of heat pipe, a large area of direct contact between the heat pipe sections 504 and the first mounting panel 204 is provided. Moreover, a relatively large area of direct contact between the different heat pipe sections 504 is provided. The sections of heat pipe 504 can be maintained in position in the groove 508 through mechanical pressure, the application of adhesive, solder, welding, or mechanical fasteners.

Figure 5F:
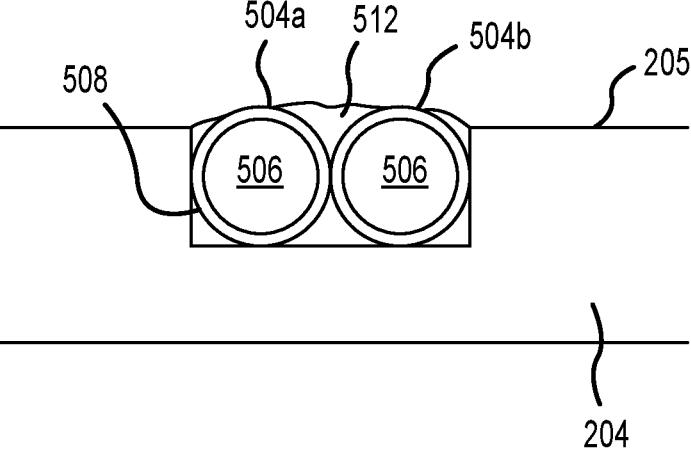
FIG. 5F depicts an interface between two sections of heat pipe and a mounting panel in accordance with other embodiments of the present disclosure.

In FIG. 5F, another example of an interface between first 504a and second 504b sections of heat pipe 504 included in a thermal energy transfer assembly 116 in accordance with embodiments of the present disclosure and a first mounting panel 204 having a groove or receiving channel 508, for instance provided as part of a first set of receiving channels 228, is illustrated. In this example, both sections 504a and 504b of heat pipe have a round cross-section, while the groove 508 has a rectangular cross-section. As illustrated, the sections of heat pipe 504a and 504b can be at least partially disposed within the groove 508, and further can be embedded in a thermally conductive adhesive or other material 512.

As can be appreciated by one of skill in the art after consideration of the present disclosure, the various components of a thermal energy transfer assembly 116 are typically formed of thermally conductive materials. For instance, the mounting panels 204 and 212 can be formed from aluminum, copper, encapsulated pyrolytic graphite, metal matrix composites, or other materials having the mechanical and heat conductance characteristics required by a particular application. The heat pipe elements 224, 228, and 216 can include a copper, steel, aluminum or other thermally conductive envelope, containing a working fluid 506 therein. As examples, but without limitation, working fluids 506 can include water, ammonia, or other fluids. In addition, the interior walls of the heat pipe elements or sections 504 can be provided with various surface treatments and/or wicking features.

Figure 6:
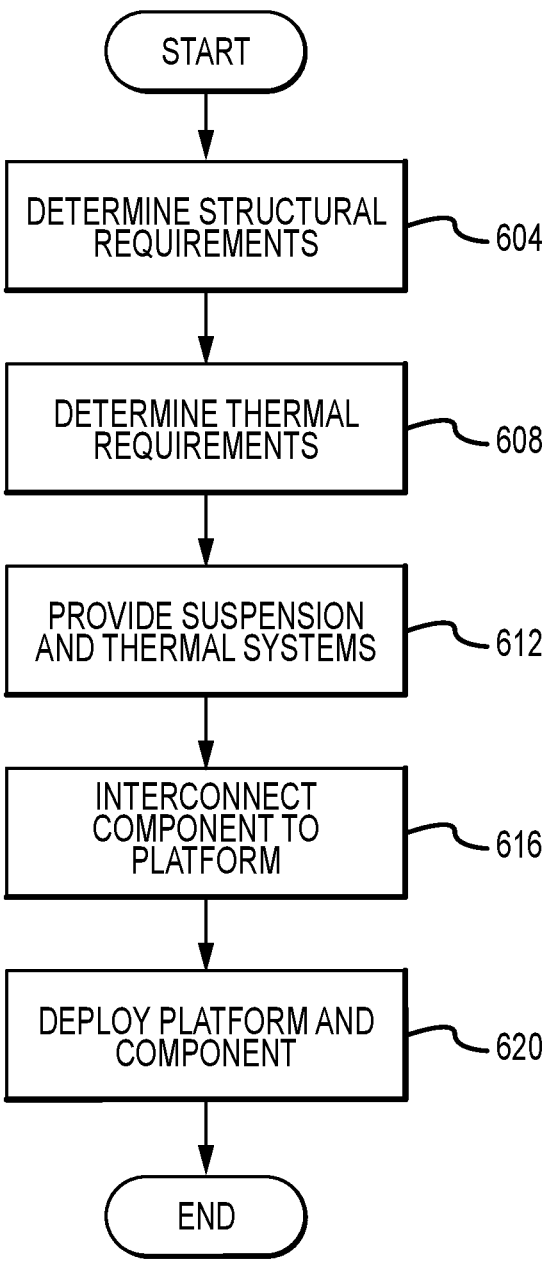
FIG. 6 depicts aspects of methods for structurally and thermally interconnecting a component to a platform in accordance with embodiments of the present disclosure.

With reference now to FIG. 6, aspects of methods for structurally and thermally interconnecting a component 108 to a platform 104 in accordance with embodiments of the present disclosure are illustrated. Initially, at step 604, the structural requirements are determined. These can include the mass and size of the component 108, and the forces that are expected to be imposed on the component 108. From this information, a suspension system 112 with the required size, strength, and damping characteristics can be specified. At step 608, the thermal or heat removal requirements are determined. These can be determined from various factors, such as the magnitude of heating that the component 108 can be expected to experience when deployed and operational, whether from the environment, operation of the component 108 itself, or other thermal sources, and the optimal or desired operating temperature of the component 108.

At step 612, a suspension system 112 and a thermal energy transfer assembly 116 that together meet the structural and thermal requirements previously determined are provided. As can be appreciated by one of skill in the art after consideration of the present disclosure, at least portions of the suspension system 112 and the thermal energy transfer assembly 116 can be integrated with one another. For example, the suspension system 112 can provide surfaces, grooves, and other structural features for interfacing with components or elements of the thermal energy transfer assembly 116. The component 108 can then be interconnected to the platform 104 by the suspension system 112 and the thermal energy transfer assembly 116 (step 616). The platform 104 and the interconnected component 108 can then be operationally deployed (step 620). The process may then end.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A system, comprising:
a suspension system, including:
    a first mounting panel;
    a shock isolating assembly; and
    a second mounting panel, wherein the first mounting panel is mechanically joined to the second mounting panel by the shock isolating assembly, and wherein the shock isolating assembly allows at least some movement of the first mounting panel relative to the second mounting panel; and
a thermal energy transfer assembly, including:
    a first heat pipe network joined to the first mounting panel;
    a heat pipe coupling assembly, wherein at least a portion of the heat pipe coupling assembly is flexible; and
    a second heat pipe network joined to the second mounting panel, wherein the heat pipe coupling assembly extends between the first heat pipe network and the second heat pipe network, wherein the first heat pipe network is thermally joined to the second heat pipe network by the heat pipe coupling assembly, and wherein the heat pipe coupling assembly includes a first section that is thermally joined to the first heat pipe network and a second section that is thermally joined to the second heat pipe network.

2. The system of claim 1, wherein the first heat pipe network is disposed in grooves formed in a surface of the first mounting panel.

3. The system of claim 2, wherein the second heat pipe network is disposed in grooves formed in a surface of the second mounting panel.

4. The system of claim 1, wherein the first heat pipe network is a serpentine element, and wherein the second heat pipe network is a serpentine element.

5. The system of claim 1, further comprising:
a component, wherein the component is fixed to the first mounting panel, wherein the component is a heat generating component, and wherein the component is thermally coupled to the first mounting panel.

6. The system of claim 1, wherein the first heat pipe network, the heat pipe coupling assembly, and the second heat pipe network each define closed volumes, and wherein each of the closed volumes contains a heat transfer medium.

7. The system of claim 1, wherein the second mounting panel is fixed to a spacecraft.

8. A system, comprising:
a component;
a suspension system, including:
    a first mounting panel, wherein the component is fixed to the first mounting panel;
    a shock isolating assembly; and
    a second mounting panel, wherein the first mounting panel is mechanically joined to the second mounting panel by the shock isolating assembly, and wherein the shock isolating assembly allows at least some movement of the first mounting panel relative to the second mounting panel; and a thermal energy transfer assembly, including:
    a first heat pipe network joined to the first mounting panel, wherein the first heat pipe network is disposed in grooves formed in a surface of the first mounting panel;
    a heat pipe coupling assembly, wherein at least a portion of the heat pipe coupling assembly is flexible; and
    a second heat pipe network joined to the second mounting panel, wherein the second heat pipe network is disposed in grooves formed in a surface of the second mounting panel, wherein the heat pipe coupling assembly extends between the first heat pipe network and the second heat pipe network, wherein the first heat pipe network is thermally joined to the second heat pipe network by the heat pipe coupling assembly, and wherein the heat pipe coupling assembly includes a first section that is thermally joined to the first heat pipe network, and a second section that is thermally joined to the second heat pipe network.

9. The system of claim 8, wherein the first section of the heat pipe coupling assembly is joined to the second section of the heat pipe coupling assembly by a connecting section.

10. The system of claim 9, wherein the connecting section of the heat pipe coupling assembly is flexible.

11. The system of claim 8, wherein the first heat pipe network, the heat pipe coupling assembly, and the second heat pipe network are part of a single integrated heat pipe system.

12. The system of claim 8, wherein the first heat pipe network, the heat pipe coupling assembly, and the second heat pipe network are separate heat pipe systems.

13. The system of claim 12, wherein the first section of the heat pipe coupling assembly is disposed adjacent a portion of the first heat pipe network, and wherein the second section of the heat pipe coupling assembly is disposed adjacent a portion of the second heat pipe network.

14. The system of claim 1, wherein the first heat pipe network, the heat pipe coupling assembly, and the second heat pipe network are part of a single integrated heat pipe system.

15. The system of claim 1, wherein the first heat pipe network, the heat pipe coupling assembly, and the second heat pipe network are separate heat pipe systems.

16. The system of claim 15, wherein the first section of the heat pipe coupling assembly is disposed adjacent a portion of the first heat pipe network, and wherein the second section of the heat pipe coupling assembly is disposed adjacent a portion of the second heat pipe network.

17. The system of claim 1, wherein the first mounting panel is spaced apart from the second mounting panel by the shock isolating assembly.

18. The system of claim 1, wherein the flexible portion of the heat pipe coupling assembly is U-shaped.

19. A system, comprising:
a platform;
a component;
a first mounting panel, wherein the component is fixed to the first mounting panel;
a second mounting panel, wherein the second mounting panel is fixed to the platform;
a shock isolating assembly, wherein the shock isolating assembly interconnects the first mounting panel to the second mounting panel, and wherein the shock isolating assembly allows at least some movement of the first mounting panel relative to the second mounting panel; and

13

14 a thermal energy transfer assembly, wherein the thermal energy transfer assembly includes:

a first heat pipe network in thermal contact with the first mounting panel;

a second heat pipe network in thermal contact with the second mounting panel; and a coupling assembly, wherein the coupling assembly thermally couples the first heat pipe network to the second heat pipe network, wherein at least portions of the first heat pipe network are disposed within grooves formed in a surface of the first mounting panel, wherein at least portions of the second heat pipe network are disposed within grooves formed in a surface of the second mounting panel, wherein at least a first portion of the coupling assembly is disposed within a groove formed in the surface of the first mounting panel, wherein at least a second portion of the coupling assembly is disposed within a groove formed in the surface of the second mounting panel, and wherein a third portion of the coupling assembly that extends between the first portion of the coupling assembly and the second portion of the coupling assembly is flexible.

20. The system of claim 19, wherein the shock isolating assembly dampens the at least some movement allowed by the shock isolation assembly between the first and second mounting panels.

21. The system of claim 20, wherein the thermal energy transfer assembly moves thermal energy from the first mounting panel to the second mounting panel.

22. The system of claim 19, wherein the platform is a spacecraft.

* * * * *